United States Patent [19]
Tanaka

[11] Patent Number: 5,379,436
[45] Date of Patent: Jan. 3, 1995

[54] APPARATUS AND METHOD FOR RESPONDING TO ABNORMAL MANIPULATIONS OF AN INFORMATION PROCESSING SYSTEM

[75] Inventor: Hidekazu Tanaka, Tokyo, Japan

[73] Assignee: Sony Corporation, Tokyo, Japan

[21] Appl. No.: 876,348

[22] Filed: Apr. 30, 1992

[30] Foreign Application Priority Data

May 1, 1991 [JP] Japan .................. 3-128352

[51] Int. Cl.$^6$ ............................. G06F 1/30
[52] U.S. Cl. ................... 395/750; 395/575; 371/29.1
[58] Field of Search ........ 395/750, 575, 325; 364/707, 273.4, DIG. 1, 948.5, DIG. 2; 371/66, 14, 12, 16.1, 16.5, 29.1

[56] References Cited

U.S. PATENT DOCUMENTS

| | | | |
|---|---|---|---|
| 3,678,499 | 7/1972 | McCarty | 315/129 |
| 4,074,245 | 2/1978 | Podany | 340/654 |
| 4,458,307 | 7/1984 | McAnlis | 371/66 X |
| 4,521,847 | 6/1985 | Ziehm et al. | 371/16.5 |
| 4,524,354 | 6/1985 | Morgan | 340/825.36 |
| 4,794,525 | 12/1988 | Pickert et al. | 395/750 |
| 4,868,832 | 9/1989 | Marrington et al. | 371/66 |
| 4,907,150 | 3/1990 | Arroyo et al. | 371/14 |
| 4,999,838 | 3/1991 | Horikawa | 371/16.1 |
| 5,012,406 | 4/1991 | Martin | 371/66 X |
| 5,014,193 | 5/1991 | Garner et al. | 395/275 |
| 5,018,148 | 5/1991 | Patel et al. | 371/66 |
| 5,148,042 | 9/1992 | Nakazoe | 307/65 |
| 5,151,992 | 9/1992 | Nagae | 395/750 |

*Primary Examiner*—Jack B. Harvey
*Assistant Examiner*—Glenn A. Auve
*Attorney, Agent, or Firm*—Limbach & Limbach

[57] ABSTRACT

An information processing apparatus and method capable of detecting an abnormal manipulation performed by an operator to a system; storing the state of a calculating unit in a memory in conformity with the result of such detection; turning off a power supply under control in conformity with the result of the detection; and displaying a message to inform the operator of the abnormal manipulation when the power supply is turned on again after the turn-off thereof. The apparatus and method further capable of confirming the connection state of a peripheral device when the power supply is turned on again; in response to a detection that the connection state of the peripheral device is not the same as that immediately before the turn-off of the power supply, outputting a message which instructs the operator to connect the peripheral device in the former state immediately before the turn-off; and in response to a detection that the peripheral device has been connected in the former state, resuming the predetermined posterior process with regard to the abnormal manipulation.

6 Claims, 8 Drawing Sheets (3-2)

APPARATUS AND METHOD FOR RESPONDING TO ABNORMAL MANIPULATIONS OF AN INFORMATION PROCESSING SYSTEM

BACKGROUND OF THE INVENTION

1. Field of the Invention

The present invention relates to an information processing apparatus and method adapted for use in a portable computer such as an electronic notebook.

2. Description of the Prior Art

If an improper manipulation such as removing a power supply battery or withdrawing an IC card during the operation of a portable computer such as an electronic notebook, runaway of the computer system may occur in the event processing continues during such an abnormal state. In an attempt to inform a user of any abnormal manipulation, it has been customary heretofore that a predetermined message is displayed and then the power supply for the system is turned off. It has also been customary that the processing required for turning off the power supply is executed prior to actual turn-off of the power supply. Thus, upon occurrence of an abnormal state in the conventional system, a message indicative of such a state is first displayed, and the power supply is switched off after execution of the entire process necessary for turn-off of the power supply. With such a process, however, a back-up battery is required for ensuring continuous operation during a period of several tens of seconds. However, such a back-up battery requirement results in considerable difficulties in realizing a dimensional reduction of the system, a lightweight structure and lower production cost.

OBJECT AND SUMMARY OF THE INVENTION

It is therefore an object of the present invention to provide an improvement capable of rapidly switching off a system power supply upon occurrence of an abnormal state to consequently minimize the required capacity of a backup power source.

According to one aspect of the present invention, there is provided an information processing apparatus comprising: means for detecting an abnormal manipulation performed by an operator to a system; memory means for storing the status of a calculating unit in response to the output signal of said detecting means; a power supply so controlled as to be switched off in response to the output signal of the detecting means; and display control means driven when the power supply is turned on again after the turn-off thereof, and serving to display a message which informs the operator of the abnormal manipulation.

According to another aspect of the present invention, there is provided an information processing method comprising the steps of: detecting an abnormal manipulation performed by an operator to a system; storing the status of a calculating unit in a memory in conformity with the result of such detection; turning off a power supply under control in conformity with the result of such detection; and displaying a message to inform the operator of the abnormal manipulation when the power supply is turned on again after such turn-off thereof.

In case the power supply is once turned off due to any abnormal manipulation when the power supply is turned on again, a message is displayed to indicate the act of such abnormal manipulation. Accordingly it becomes unnecessary to utilize a backup power source for displaying the message.

Furthermore, once the power source having been turned off due to the abnormal manipulation is turned on again, peripheral devices are re-connected in the same state as that immediately before the turn-off the power supply, and then processing is resumed with regard to the abnormal manipulation. Consequently the processing immediately prior to the turn-off of the power supply can be reduced to eventually minimize the backup power source.

The above and other features and advantages of the present invention will become apparent from the following description which will be given with reference to the illustrative accompanying drawings.

DESCRIPTION OF THE PREFERRED EMBODIMENT

Figure 1:
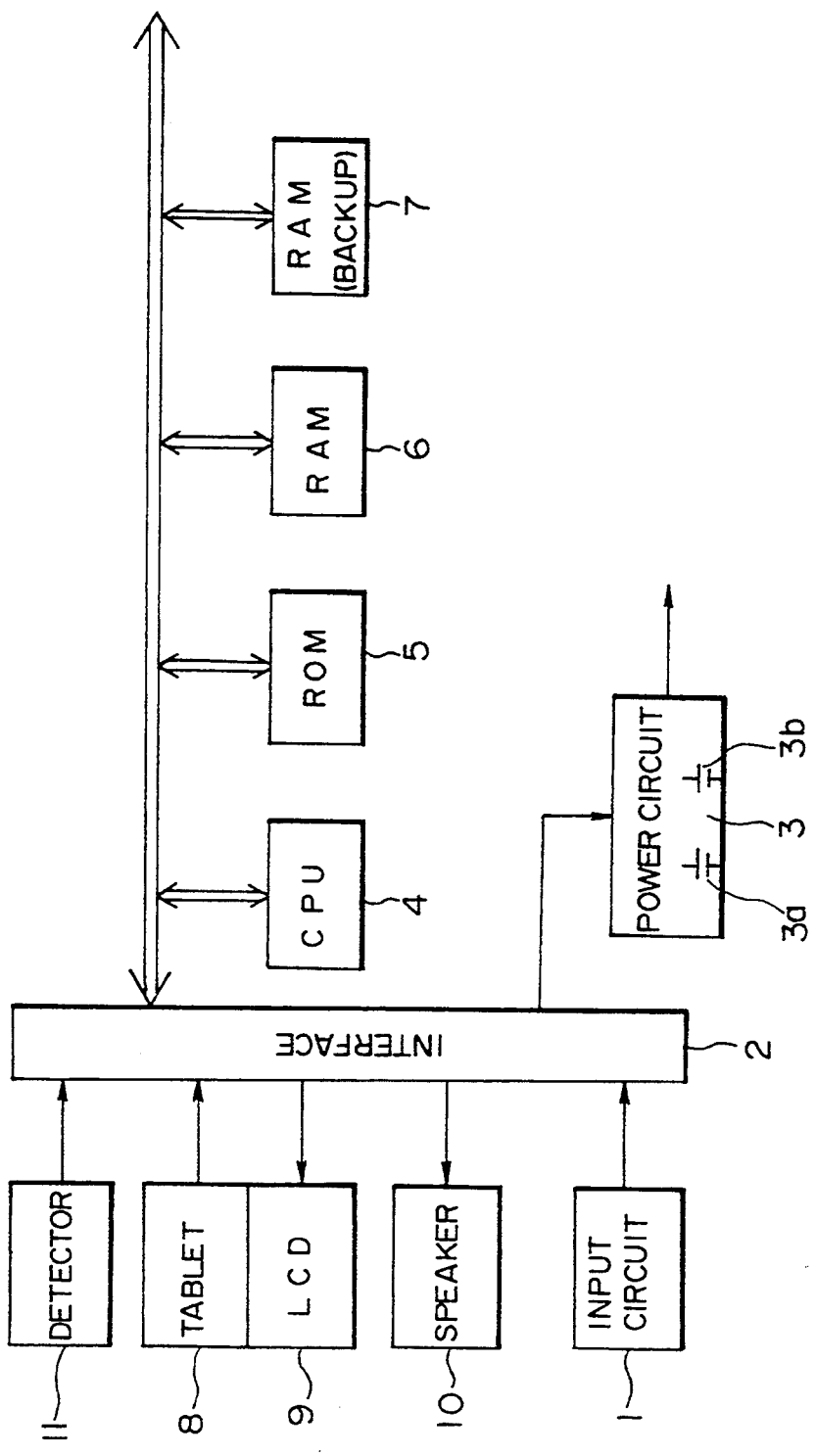
FIG. 1 is a block diagram of an exemplary embodiment representing the information processing apparatus of the present invention.

Hereinafter the present invention will be described in detail with reference to the accompanying drawings. FIG. 1 is a block diagram showing the structure of an information processing apparatus according to the present invention. Denoted by 1 in the diagram is an input circuit including a power switch and other switches, and an input signal fed thereto is supplied via an interface 2 to a CPU 4. A power circuit 3, which incorporates a battery 3b and an emergency backup capacitor 3a, supplies required power therefrom to each of component elements. In a ROM 5, there are stored a variety of preset data including a program required for operating the CPU 4. Meanwhile in a RAM 6, data required for the operation are stored when necessary. A RAM 7 is a memory backed up by the power circuit 3.

An LCD 9 and a tablet 8 are mutually integrated in such a manner that an image displayed on the LCD 9 can be seen through the tablet 8. The tablet 8 is comprised of a pressure-sensitive or capacitance type coordinate detector, and data inputted thereto from an unshown pen or the like can be supplied via the interface 2 to the CPU 4. A loudspeaker 10 is provided for emitting a predetermined audio signal when necessary. A detecting circuit 11 operates to detect an abnormal manipulation and delivers a detection output via the interface 2 to the CPU 4.

Figure 2:
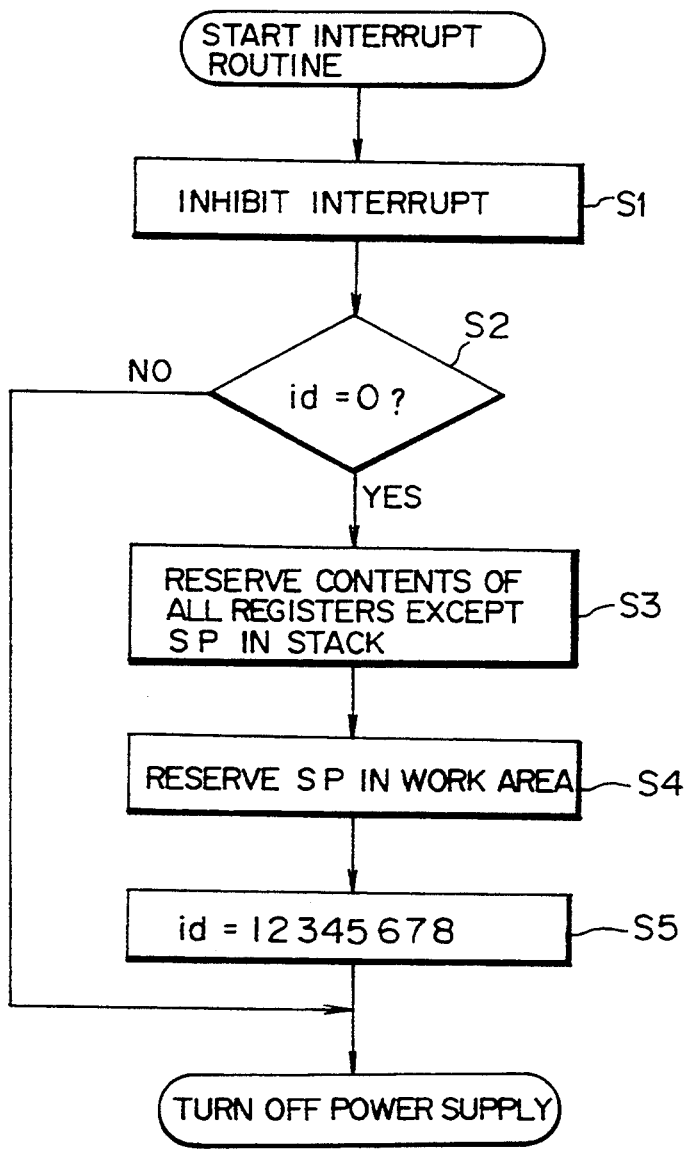
FIGS. 2 to 4 are flow charts for explaining the procedure of an operation performed in the embodiment of FIG. 1.

Now the operation performed upon occurrence of an abnormal state will be described below with reference to flow charts of FIGS. 2 through 4.

When the battery 3b is removed suddenly or an unshown IC card or the like is withdrawn during system operation, the detecting circuit 11 detects such a state and outputs a detection signal via the interface 2 to the CPU 4. The CPU 4 then executes an interrupt routine shown in the flow chart of FIG. 2.

First at step S1, an interrupt is inhibited. Subsequently the operation proceeds to step S2 where a decision is made as to whether a parameter id is 0 or not. As will be described later, the parameter id is set to a predetermined value (12345678 in this embodiment) upon occurrence of an abnormal state, and it is set to 0 in response to occurrence of a further abnormal state during the action for release from the abnormal manipulation. In case the parameter id is 0, the operation proceeds to step S3 to reserve the contents of entire registers in a stack with the-exception of a stack pointer. At step S4, the stack pointer is reserved in a work area. Namely, the status of the CPU 4 (calculating unit) is stored. Both the stack and the work area are included in the backup RAM 7. Then the operation proceeds to step S5, where the aforementioned parameter id is set to a value 12345678, so that the act of an abnormal manipulation is stored. After the process at step S5, the CPU 4 controls the power circuit 3 to switch off the power supply.

If the result of the decision at step S2 signifies that the parameter id is not 0, the power supply is switched off with omission of the process at steps S3 to S5. In case a further abnormal state occurs during the action for release from the abnormal manipulation (i.e. when the parameter id set to 12345678 at step S5 still remains unchanged and the release action posterior thereto has not yet been completed) the process at steps S3 through S5 is omitted.

Figure 3:
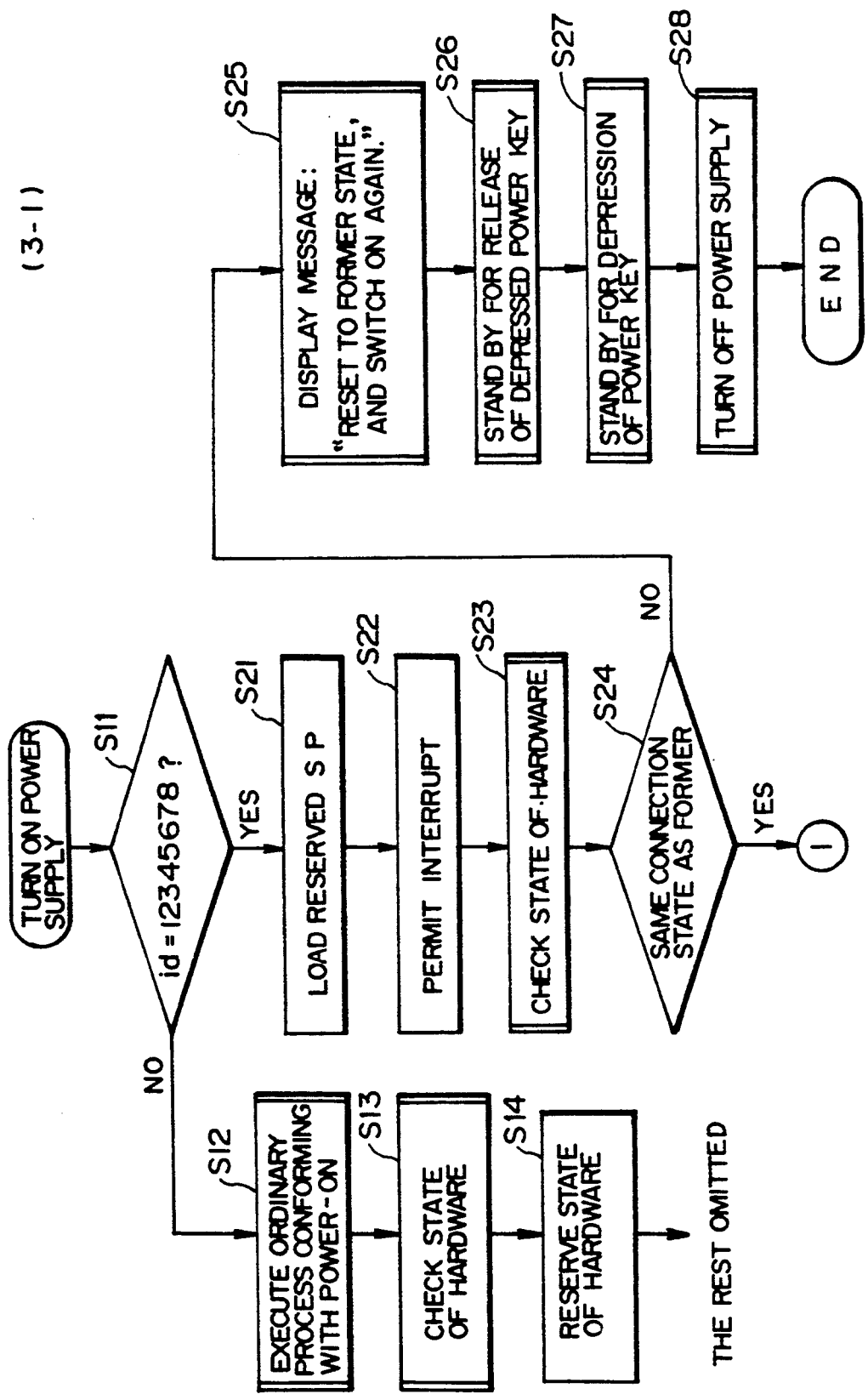
Figure 4:
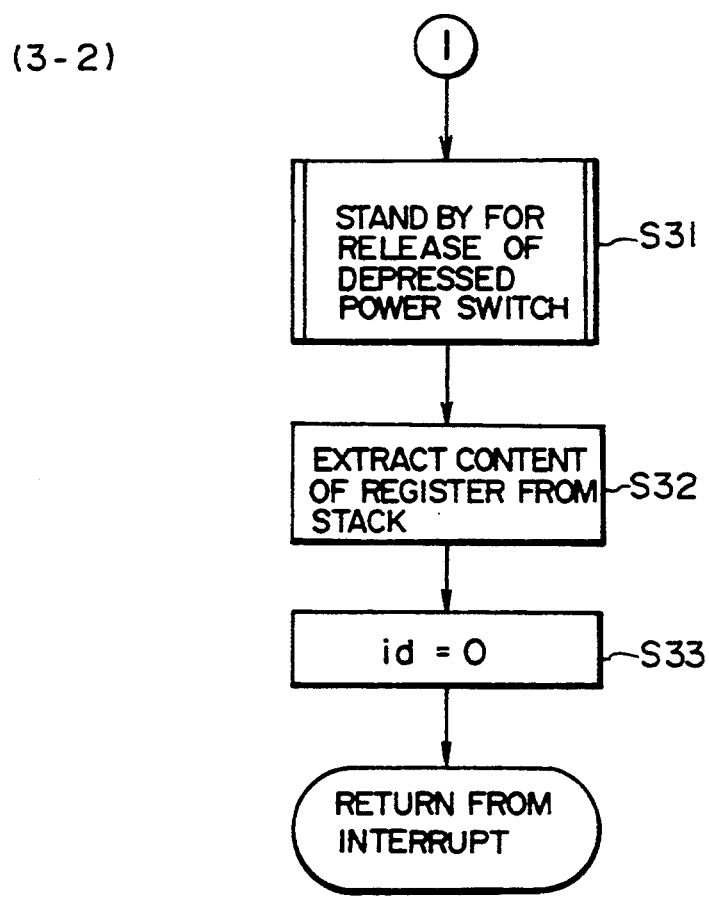

After completion of the process to switch off the power supply upon occurrence of an emergency as mentioned, if the user switches on the power supply again, then the procedure shown in the flow charts of FIGS. 3 and 4 is executed. First at step S11, a decision is made as to whether the parameter id is equal to 12345678 or not. As will be described later, if the action for release from the abnormal manipulation is performed properly, the parameter id is reset to 0. Then the operation proceeds to step S12 where the ordinary process for switching on the power supply is executed. Subsequently at step S13, the status of the hardware and other units are checked, and such status are stored at step S14. Thereafter the operations in a normal state are performed sequentially.

Meanwhile, if the result of the decision at step S11 signifies that the parameter id is equal to 12345678, i.e. when the value set at step S5 still remains unchanged as the parameter id (prior to completion of the action for release from the abnormal manipulation) then the operation proceeds to step S21 where the reserved stack pointer is loaded, and thereafter the interrupt is permitted at step S22. Further at step S23, the status of the hardware is checked. At step S24, a decision is made as to whether the connection state of each peripheral device (IC card or the like) is the same as that immediately before the turn-off of the power supply.

Figure 5:
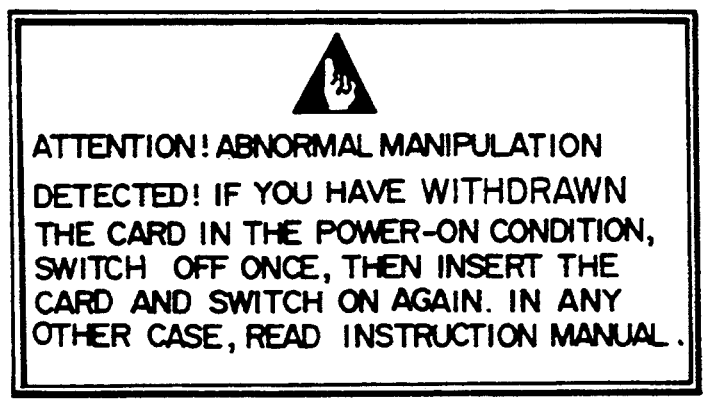
FIG. 5 shows an exemplary message displayed at step S25 in the flow chart of FIG. 3.

If the result of such decision signifies that the connection state is different from the former, the operation proceeds to step S25 where a message shown in FIG. 5 for example is read out from the ROM 5 and then is displayed on the LCD 9. This message informs the user of an abnormal manipulation such as removal of the IC card during the system operation and instructs him to once switch off the power supply and to insert the IC card properly before switching on the power supply again.

Subsequently the operation proceeds to step S26 to stand by for a release of the depressed power switch in the input circuit I (i.e. for completion of the manipulation to switch on the power supply). Upon release of the depressed power switch, the apparatus is placed on standby for re-depression of the power switch to turn off the power supply at step S27. Thereafter, when the power switch is turned on and a subsequent power-off instruction is outputted, a process for turning off the power supply is executed at step S28.

Meanwhile, if the result of the decision at step S24 signifies that the connection state is the same as the former, the user properly inserts the IC card in compliance with the displayed message of FIG. 5 and turns on the power supply. Then the operation proceeds to step S31, and the apparatus is placed on standby for release of the power switch from a depression. And upon release of the power switch, the operation proceeds to step S32 where the relevant register is extracted from the stack, and thereafter the parameter id is set to 0 at step S33. Due to the procedure mentioned, the operation returns from the interrupt to the process prior to the start of the interrupt routine shown in FIG. 2.

When an abnormal state occurs as described above, merely the status of the CPU 4 alone is shunted, and all the other terminating processes are executed after the power supply is turned on again, so that the requisite of the backup capacitor 3a in the power circuit 3 is a capability of backing up the system for a time of at most several ten microseconds to milliseconds. Therefore a super-capacitor of a great capacity employed generally in the conventional apparatus is no longer necessary.

Meanwhile when the power supply is turned off in a normal state, the required processes for termination includes, for example, closing the file, ejecting the disk buffer, calculating the check sum, reserving and registering the page open at the present, and checking the alarm. Since such processes are executed after the power supply is turned on again in this embodiment, it becomes possible to realize fast turn-off of the power supply.

The description given above is concerned with the urgent processes executed with regard to an abnormal manipulation. However, it is a matter of course that such abnormal manipulation should be averted if possible. Accordingly it is necessary to urge the user to pay sufficient attention not to repeat the abnormal manipulation thereafter. For the purpose of displaying a message which arouses the attention of the user, an exemplary procedure shown in the flow charts of FIGS. 6 through 8 is executed.

Figure 6:
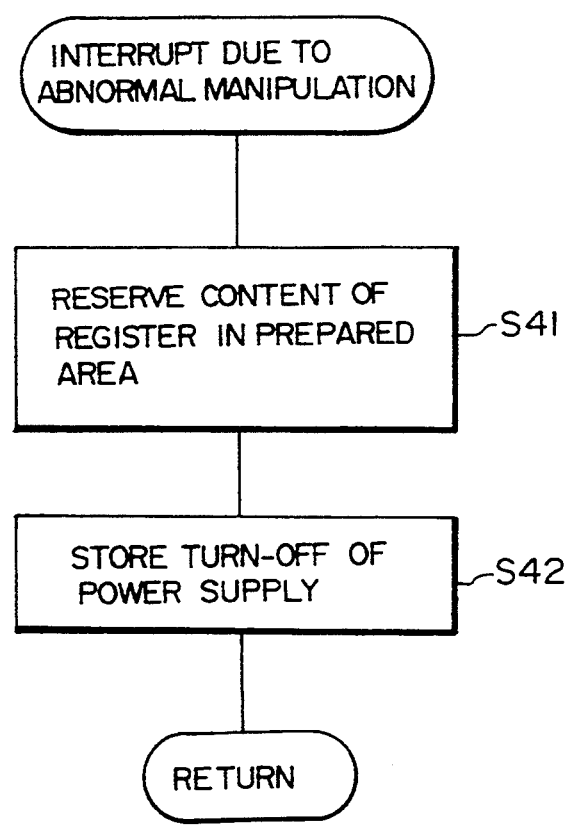
FIGS. 6 to 8 are flow charts that explain the procedure of the operation performed in the embodiment of FIG. 1.

Upon occurrence of an abnormal state, the interrupt routine shown in the flow chart of FIG. 6 is executed. First at step S41, the content of the register is reserved in a prepared area, and the power supply is switched off at step S42. Then the execution of such power-off action derived from the abnormal state is stored.

Figure 7:
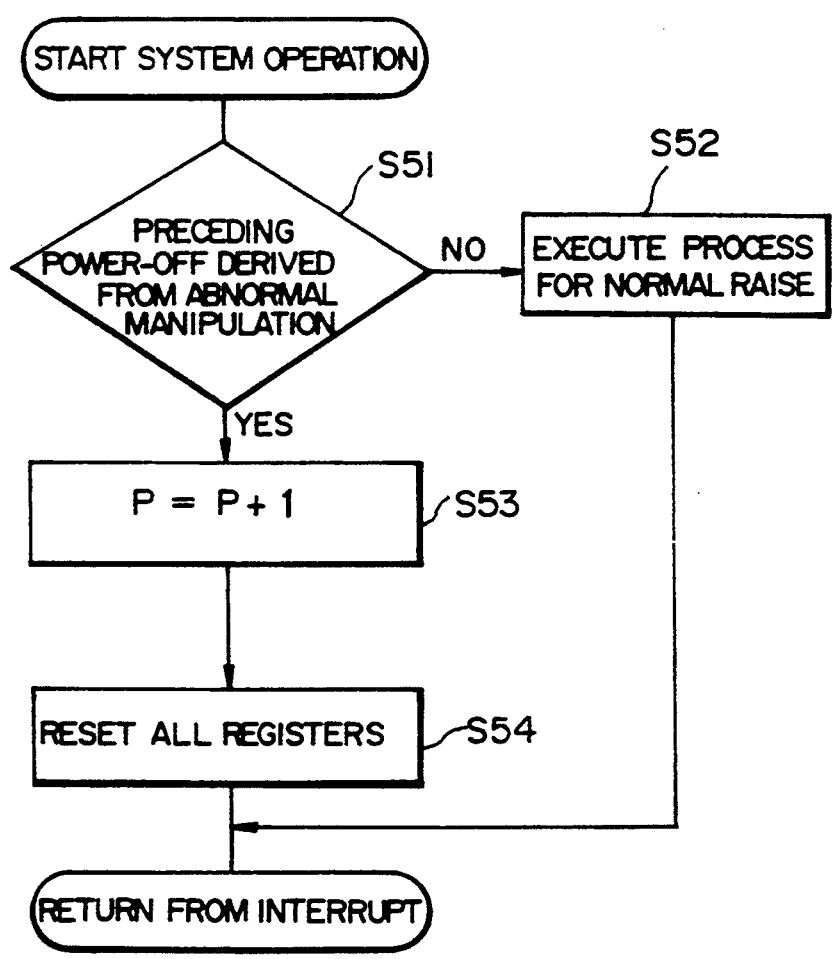

Thereafter when the user turns on the power supply, the interrupt routine shown in FIG. 7 is executed. First at step S51, a decision is made as to whether the preceding turn-off of the power supply is derived from occurrence of any abnormal state. In case the result of such decision signifies that the preceding turn-off is not caused by any abnormal state, the operation proceeds to step S52 where a normal process for raising the power supply is executed. To the contrary, if the result of the decision signifies that the turn-off of the power supply is derived from any abnormal state, a parameter P (counter) indicating the number of times of turning off the power supply is incremented by 1 at step S53. And the process for releasing the entire registers is executed at step S54. And subsequently the operation returns to the process immediately before the interrupt in FIG. 6.

Figure 8:
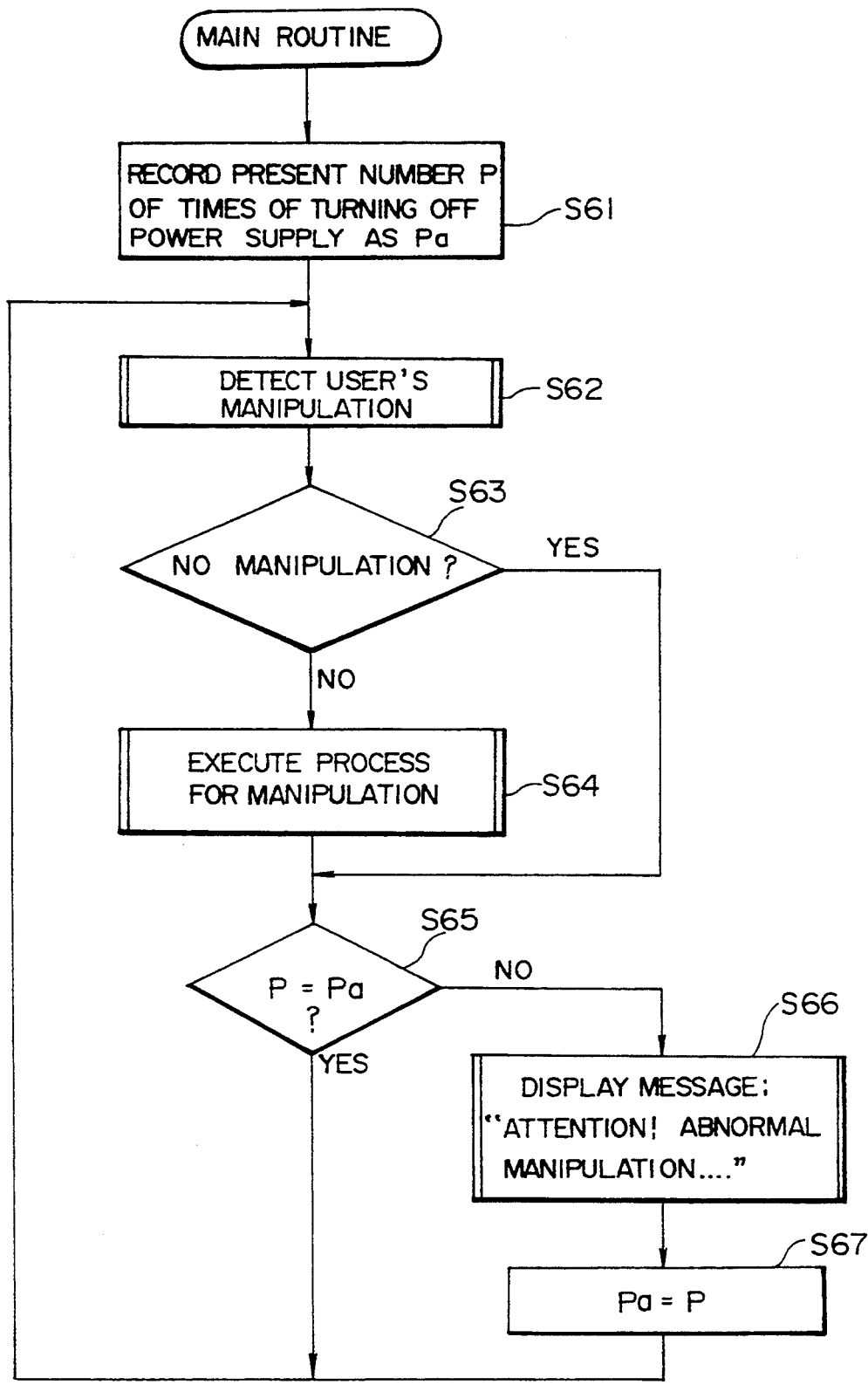

Meanwhile the CPU 4 executes, in contrast with such interrupt process, the main routine shown in the flow chart of FIG. 8. At step S61, the parameter P indicating the present number of times of turning off the power supply is recorded as Pa which indicates the preceding number of times of turning off the power supply. Subsequently at step S62, the manipulation by the user is detected. And at step S63, a decision is made as to whether no manipulation has been performed or not. If the result of such decision signifies any manipulation, the operation proceeds to step S64, and the predetermined process corresponding to such manipulation is executed. In case the result of the decision signifies no manipulation, step S64 is skipped.

Figure 9:
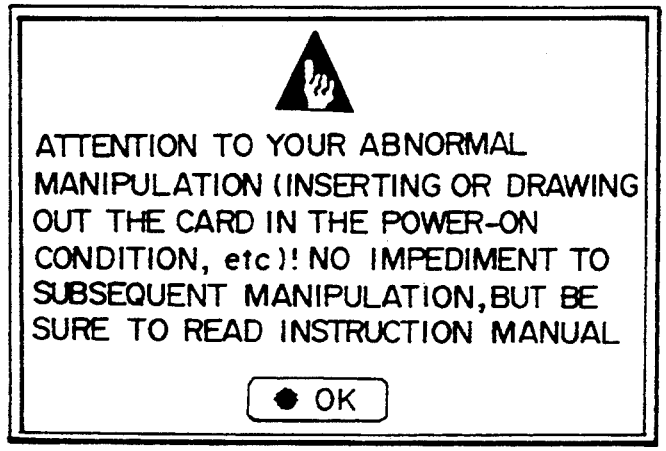
FIG. 9 shows another exemplary message displayed at step S66 in the flow chart of FIG. 8.

Next at step S65, a decision is made as to whether the parameters P and Pa are equal or not to each other. In case the power supply is turned off due to occurrence of any abnormal state, the parameter P is incremented by 1 at step S53 in FIG. 7. It follows therefore that the parameter P is not coincident with another parameter Pa. Then the operation proceeds to step S66 where a message of FIG. 9 for example is displayed. This message signifies that an abnormal manipulation (such as removal or insertion of the IC card in the on-state of the power supply) has been performed, that no impediment is existent to any subsequent manipulation, and also that the user needs to read the instruction manual for a manipulation thereafter. Thus the user is informed of the fact that his manipulation has been improper and is thereby warned not to repeat such abnormal manipulation. In this manner, repeated execution of the same improper manipulation can be suppressed.

The operation further proceeds to step S67 where the value of the parameter P is set to that of the parameter Pa, and then returns to step S62.

In view of suppressing any abnormal manipulation, it is desired that the message mentioned above be displayed prior to turn-off of the system power supply immediately after the abnormal manipulation. In such a case, however, a backup power source of a great capacity is required for displaying the message. Therefore, in an electronic notebook or the like where portability is an important merit, it is preferred that such message be displayed after the system power supply is turned on so as to minimize the required capacity of the backup power source.

Occurrence of an abnormal state is checked and detected in the main routine instead of an individual application program. Therefore the burden imposed on each application program is rendered minimal.

According to the present invention, as described hereinabove, the power supply is once turned off in response to detection of any abnormal manipulation performed to the system, and a message indicative of such abnormal manipulation is displayed when the power supply has been turned on again, hence shortening the time until turn-off of the power supply immediately after the abnormal manipulation to eventually achieve a diminution in the required capacity of the backup power source. Consequently it becomes possible to realize a dimensional reduction of the system, a lightweight structure and lower production cost.

Further according to the present invention, the status of the computing unit is stored and the power supply is turned off in response to detection of occurrence of any abnormal manipulation, and when the power supply is turned on again thereafter, a message is displayed to instruct the user to connect the peripheral device in the same state as that immediately before the turn-off of the power supply. And if the connection state is the same as the former, the process complying with the abnormal operation is executed to consequently minimize the required backup power source, hence attaining the same advantages as the above.

What is claimed is:

1. An information processing apparatus comprising:
    detecting means for detecting an abnormal manipulation performed by an operator to a system;
    memory means for storing a status of a calculating unit in response to an output signal of said detecting means;
    a power supply so controlled as to be turned off in response to the output signal of said detecting means;
    means for detecting connection states of a peripheral device;
    means for outputting a message in response to a detection that a connection state of said peripheral device when said power supply is turned on again after the turn-off thereof is not the same as a connection state of said peripheral device immediately before the turn-off of said power supply, said message instructing the operator to connect said peripheral device in the connection state of said peripheral device immediately before said turn off; and
    control means for resuming a predetermined posterior process with regard to said abnormal manipulation in response to a detection that said peripheral device has been connected in the connection state of said peripheral device immediately before the turn-off of the power supply.

2. The apparatus according to claim 1, wherein said abnormal manipulation signifies an act of removing a battery or pulling out a power cord suddenly during the operation of said system.

3. The apparatus according to claim 1, wherein said abnormal manipulation signifies an act of drawing out an IC card suddenly during the operation of said system.

4. The apparatus according to claim 1, wherein the stored content in said memory means is retained by a backup power source.

5. The apparatus according to claim 1, wherein said system is a portable computer having at least a display unit and a manipulation control unit.

6. An information processing method comprising the steps of:
    detecting an abnormal manipulation performed by an operator to a system;
    storing a state of a calculating unit in response to the detection of an abnormal manipulation;
    turning off a power supply in response to the detection of an abnormal manipulation;
    detecting a connection state of a peripheral device when said power supply is turned on again after the turn-off thereof in response to the detection of an abnormal manipulation;
    in response to a detection that the connection state of said peripheral device is not the same as a connection state immediately before the turn-off of said power supply, outputting a message which instructs the operator to connect said peripheral device in the connection state immediately before said turn-off; and in response to a detection that said peripheral device has been connected in said connection state immediately before said turn-off, resuming a predetermined posterior process with regard to said abnormal manipulation.

* * * * *